US005294141A

United States Patent [19]

Mentessi et al.

[11] Patent Number: 5,294,141

[45] Date of Patent: Mar. 15, 1994

[54] ATTENDED TO SELF PROPELLED CONVERTIBLE PIVOTING WHEELCHAIR

[75] Inventors: Roland A. Mentessi, North Royalton; Allen J. Boris, Elyria; Neal J. Curran, Lakewood, all of Ohio

[73] Assignee: Invacare Corporation, Elyria, Ohio

[21] Appl. No.: 937,587

[22] Filed: Aug. 31, 1992

Related U.S. Application Data

[63] Continuation of Ser. No. 612,812, Nov. 14, 1990, abandoned.

[51] Int. Cl.[5] .............. B62B 3/02

[52] U.S. Cl. .............. 280/250.1; 188/2 F; 280/304.1; 280/650; 280/47.4; 297/328; 297/354.12

[58] Field of Search .............. 188/2 F, 69; 297/327, 297/328, 355; 280/250.1, 304.1, 647, 648, 650, 47.34, 47.38, 47.4

[56] References Cited

U.S. PATENT DOCUMENTS

| | | | |
|---|---|---|---|
| 3,198,575 | 8/1965 | Hawkins | 297/328 |
| 4,322,093 | 3/1982 | Otto | 188/2 F X |
| 4,643,446 | 2/1987 | Murphy et al. | 280/250.1 |
| 4,732,423 | 3/1988 | Condon | 297/328 X |
| 4,736,960 | 4/1988 | Batty et al. | 280/250.1 X |
| 4,893,827 | 1/1990 | Gay et al. | 280/250.1 |
| 4,934,722 | 6/1990 | Goetzelman | 280/250.1 |
| 4,989,890 | 2/1991 | Lockard et al. | 280/250.1 X |

*Primary Examiner*—Margaret A. Focarin
*Assistant Examiner*—Michael Mar
*Attorney, Agent, or Firm*—Fay, Sharpe, Beall, Fagan, Minnich & McKee

[57] ABSTRACT

A convertible wheelchair permits change over from an attended wheelchair arrangement to a self propelled wheelchair arrangement. The wheelchair accommodates both lateral and longitudinal dimensional changes. Further, the seat can pivot relative to the frame, as well as permitting a seat back to tilt relative to the seat portion. In the attended wheelchair arrangement, the rear wheels are simultaneously locked.

20 Claims, 10 Drawing Sheets

ATTENDED TO SELF PROPELLED CONVERTIBLE PIVOTING WHEELCHAIR

This is a continuation application of copending application Ser. No. 07/612,812, filed Nov. 14, 1990 now abandoned.

BACKGROUND OF THE INVENTION

This invention pertains to the art of wheelchairs, and more particularly to children's wheelchairs.

The invention is applicable to a convertible wheelchair that easily transforms from an attended wheelchair arrangement to a self propelled wheelchair arrangement and will be described with particular reference thereto. However, it will be appreciated that certain aspects of the invention have broader applications and may be advantageously employed in other wheelchair environments and applications.

Versatility and safety are primary concerns in the design of wheelchairs. Particularly, and with wheelchairs intended for children and young adults, it is important to provide a chair that changes or adapts to the growth of the child. Without such adaptability and versatility, a new wheelchair must be periodically purchased to accommodate the various growth stages of the child.

For example, attended wheelchairs include handles so that an attendant can easily move the child in the wheelchair, in much the same manner as a stroller. In such an arrangement, the child or other wheelchair occupant is not intended to individually operate or propel the wheelchair. Instead, the wheelchair is designed to be pushed by an attendant, thus the origin of the name.

In many cases, and as the child grows, the child can or even desires to operate the wheelchair on his/her own. Obviously, this gives the child a greater sense of freedom. Unfortunately, attended and self propelled wheelchairs are typically two distinct wheelchairs. Therefore, a child who has been using an attended wheelchair must obtain a self propelled wheelchair.

Another aspect of versatility is the ability to tilt and/or pivot the seat through a preselected range of angular movement while maintaining a stable support.

Likewise, versatility of a wheelchair design should equally address both lateral and longitudinal dimensional changes that easily convert the wheelchair to different incremental sizes.

Yet another aspect of versatility Is the ability of the wheelchair to adapt to after market conversions. For example, certain wheelchair users require specialized seat supports. Use of molded seats or lateral bracing should be easily adapted to the standard off-the-shelf wheelchair design without a significant amount of modification.

Unfortunately, these various needs have not been adequately addressed by the industry. Thus, the prospective purchaser is forced into picking and choosing selected options while sacrificing the availability of other options.

SUMMARY OF THE INVENTION

The present invention contemplates a new and improved wheelchair that overcomes all of the above-referred to problems and others and provides a wide range of features and options that are included in the wheelchair or easily converted in a simple, reliable, and safe manner.

According to the present invention, the convertible wheelchair includes a seat pivotally received on a frame. First and second pairs of rear wheels may be alternately used to provide an attended wheelchair arrangement and a self propelled wheelchair arrangement.

According to another aspect of the invention, means for limiting the extent of pivoting movement is provided.

According to yet another aspect of the invention, the frame is easily expanded in both lateral and longitudinal directions without the use of additional components.

According to a still further aspect of the invention, the rear wheels can be simultaneously locked in one of the wheelchair arrangements.

A principal advantage of the invention is the provision of a wheelchair that is highly versatile and provides a wide range of options to its user.

Another advantage of the invention resides in the ability to pivot the seat relative to the frame, as well as tilt the seat back relative to the seat portion.

Still another advantage is found in the ability to easily convert the wheelchair from an attended to a self propelled arrangement.

Yet another advantage is found in the ability to incrementally change the size of the wheelchair.

Still another advantage in realized by the ability to accept after market conversions.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE PREFERRED EMBODIMENT

Figure 1:
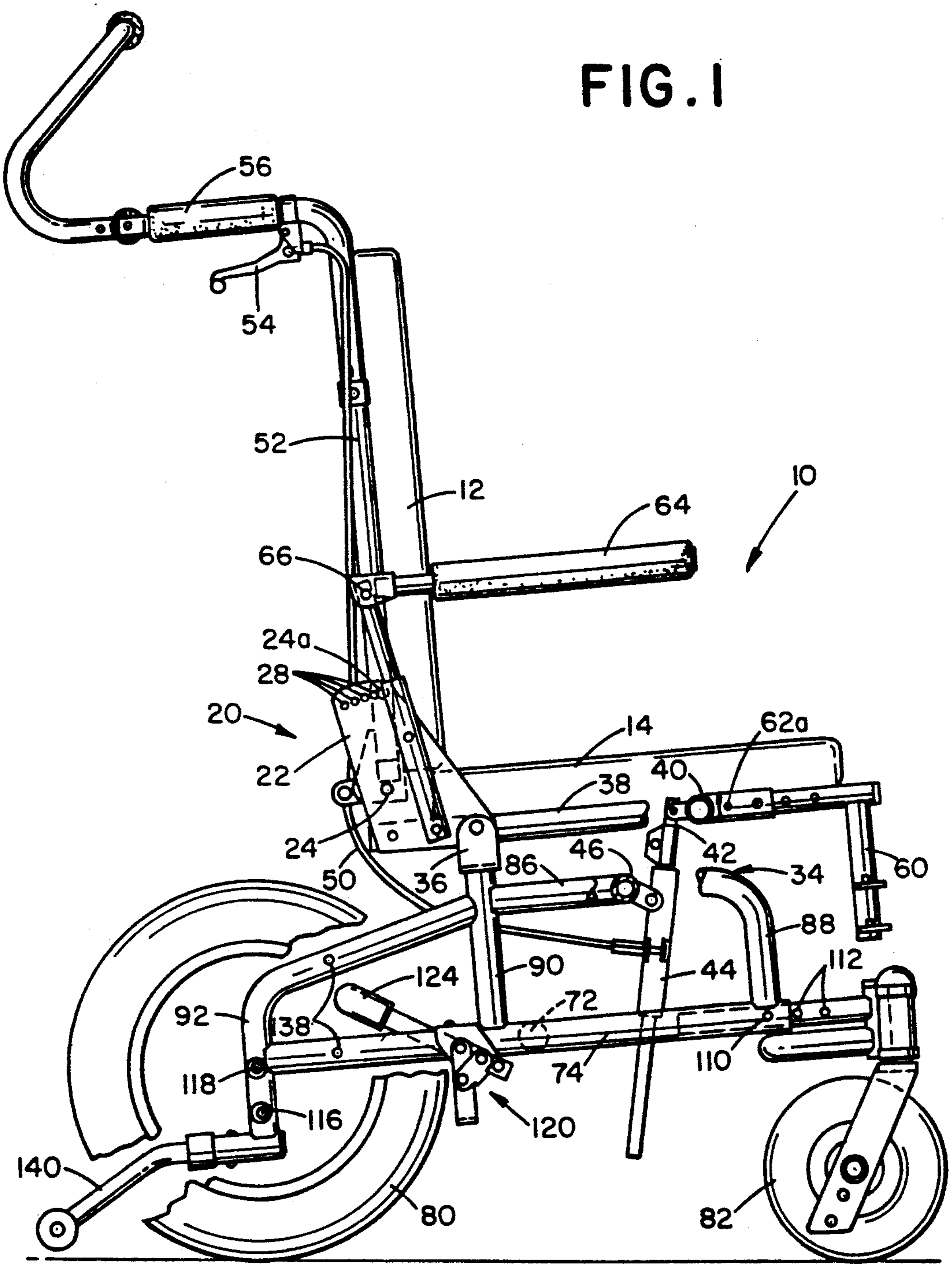
FIG. 1 is a side elevational view of the attended wheelchair arrangement.
Figure 2:
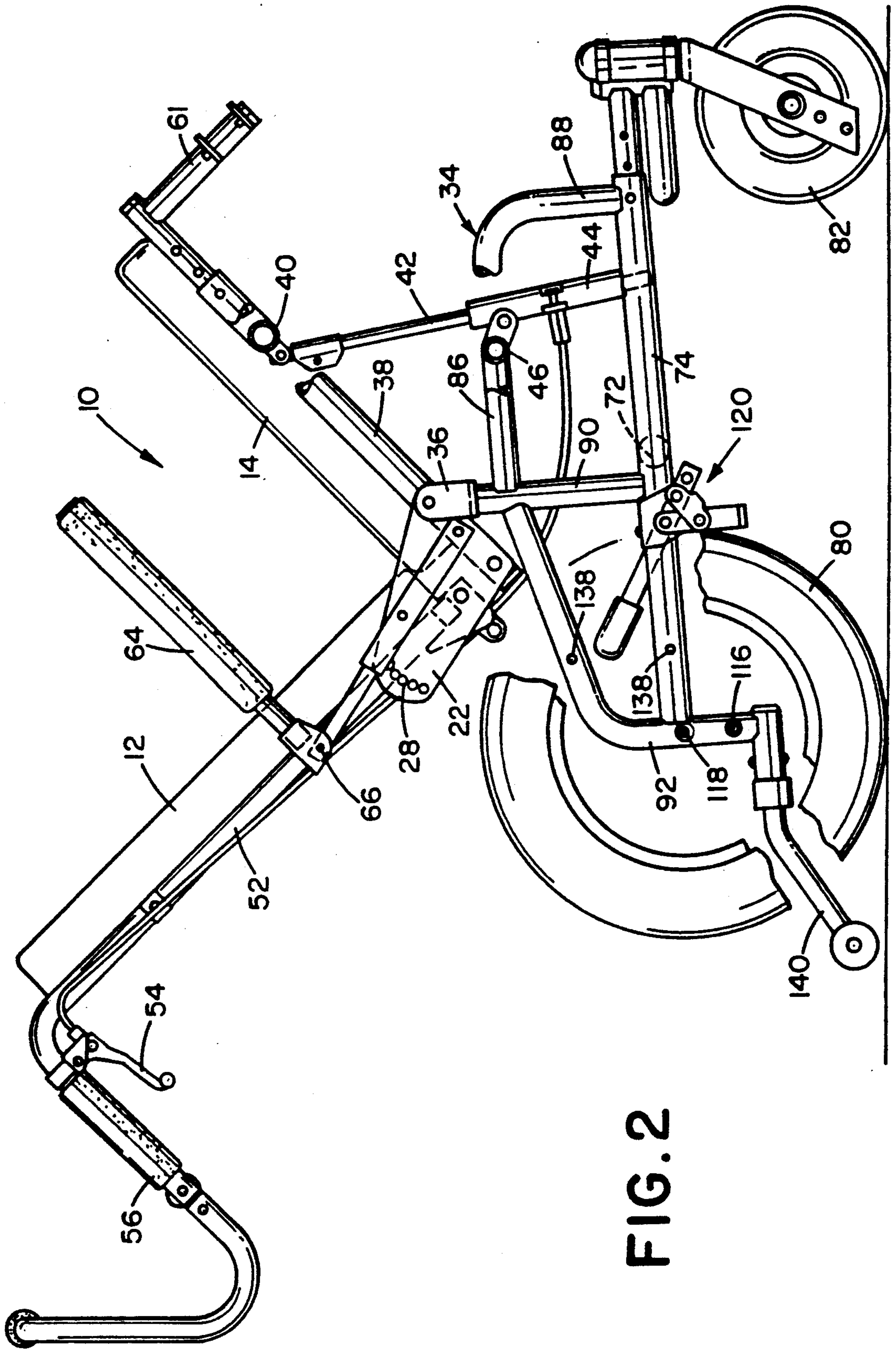
FIG. 2 is a view similar to FIG. 1 but illustrating the seat in a pivoted arrangement.

Referring now to the drawings wherein the showings are for purposes of illustrating the preferred embodiment of the invention only and not for purposes of limiting same, the FIGURES show a convertible wheelchair that may be easily converted from an attended arrangement A to a self propelled arrangement D. More particularly, and with reference to FIGS. 1-5, attention is initially directed to the attended wheelchair arrangement shown therein. The wheelchair includes a seat 10 having a seat back 12 and a seat portion 14 disposed in generally perpendicular relation. Means 20 for tilting the sent back through a total range of 20°, in 5° increments, is provided along the hinge region of the seat back and seat portion. The tilting means 20 includes a bracket 22 disposed on each side of the wheelchair and secured to tile seat portion through which an elongated rod 24 forming a hinge point, and fastener 24*a* (FIG. 3) extends. The bracket 22 includes a series of spaced openings 28 disposed in an arcuate pattern. Individual fasteners 24*a*, one on each side of the wheelchair, are positioned in selected ones of the openings to tilt the seat back in 5° increments through a range of five positions. That is, the overall range of tilt is 20° from the rightmost opening to the leftmost opening.

The seat is also pivotally mounted on main frame 34 so that, independently of the tilting means, the seat can be pivoted from an upright position (FIG. 1) to a pivoted arrangement (FIG. 2) approximately 45° therefrom. The pivoting means includes a pair of U-shaped members 36 extending upwardly from the main frame on which is mounted a lower rigid portion of the seat portion. That is, a pair of elongated tubes 38 extend along lateral edges of the seat portion. Rear ends of these tubes are pin mounted in the U-shaped portion of the frame to permit selective pivoting of the seat relative to the main frame. The pivoting means also includes a cross member 40 extending across the underside of tile seat portion between the tubes 38. Rotatably secured to the cross member are first ends of a pair of rods 42. The second ends of the rods are received through wire actuated clamp means 44.

The two clamp means are pin mounted on a tubular cross brace 46 of the main frame. A wire so extends from the clamp means, along seat back frame elements 52, to hand actuated levers 54 mounted oil the push handle 56. Depressing the levers releases the clamp means and permits an attendant to pivot the seat 10 to any desired position between the upright position of FIG. 1 and the pivoted position of FIG. 2. By merely releasing the levers, the clamp means tightly grip the second ends of the rods and hold the seat in the desired position.

Extending from the front end of the seat portion, more particularly the tubular elements 38, are a pair of mounts 60 for swing away leg supports 61. The mounts are secured to the tubular elements by fasteners 62*a*, 62*b* and include plural openings therein that allow selective longitudinal extension of the leg supports from the seat portion if desired. The leg support mounts are otherwise of conventional structure and thus further description herein is deemed unnecessary to a full and complete understanding of the invention.

Likewise, a pair of arm rests 64 are rigidly mounted on the bracket 22. The arm rests are adapted for a 90° range of movement through pivot 66 so that they may be retracted to a position generally parallel with the seat back frame elements 52 if so desired. By mounting the arm rests on the frame bracket 22, any tilting action of the seat back does not affect the desired position of the arm rests relative to the seat portion.

Although the main frame 34 is constructed of metal tubular elements, one will understand that other configurations and materials of construction can be used without departing from the overall scope and intent of the invention. More particularly, the main frame includes first and second portions 70, i.e., left-hand and right-hand frame elements 70*a*, 70*b* that are interconnected by cross members 46, described above, and 72. As will become more apparent below, each of these cross members is comprised of cooperating, telescoping portions having plural fastener receiving openings. A lower, generally horizontal member 74 extends from rear wheels 80 to adjacent the caster mounted front wheels 82. A second horizontal member 86 extends in generally parallel relation to member 74 and is interconnected therewith at the front by member 88, at a central portion by member 90, and at the rear by member 92. As is apparent, and due to the tubular construction, selected ones of these frame elements maybe made from the same tubular element if so desired.

Figure 3:
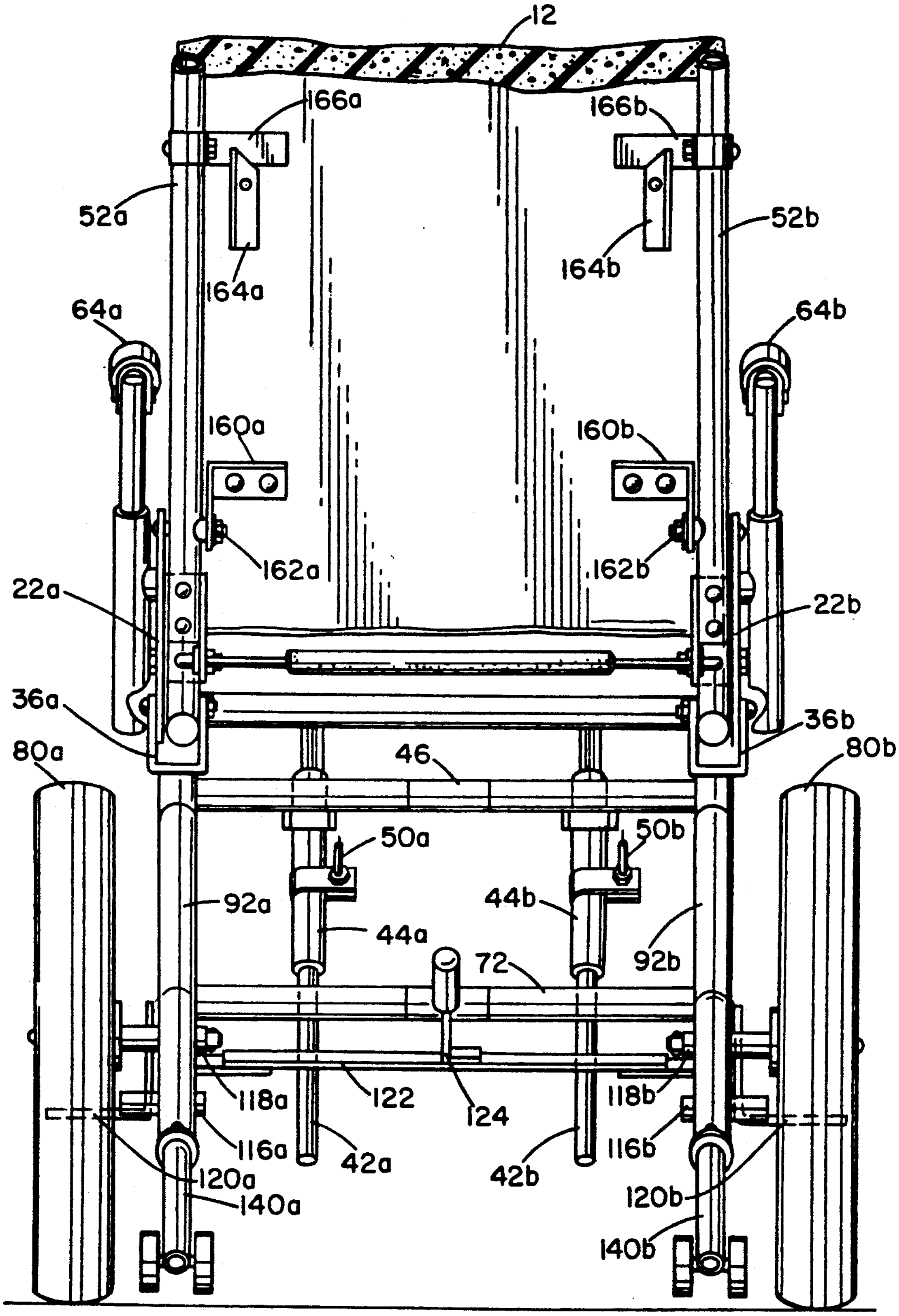
FIG. 3 is a rear elevational view of the attended wheelchair arrangement taken from the left-hand end of FIG. 1.
Figure 4:
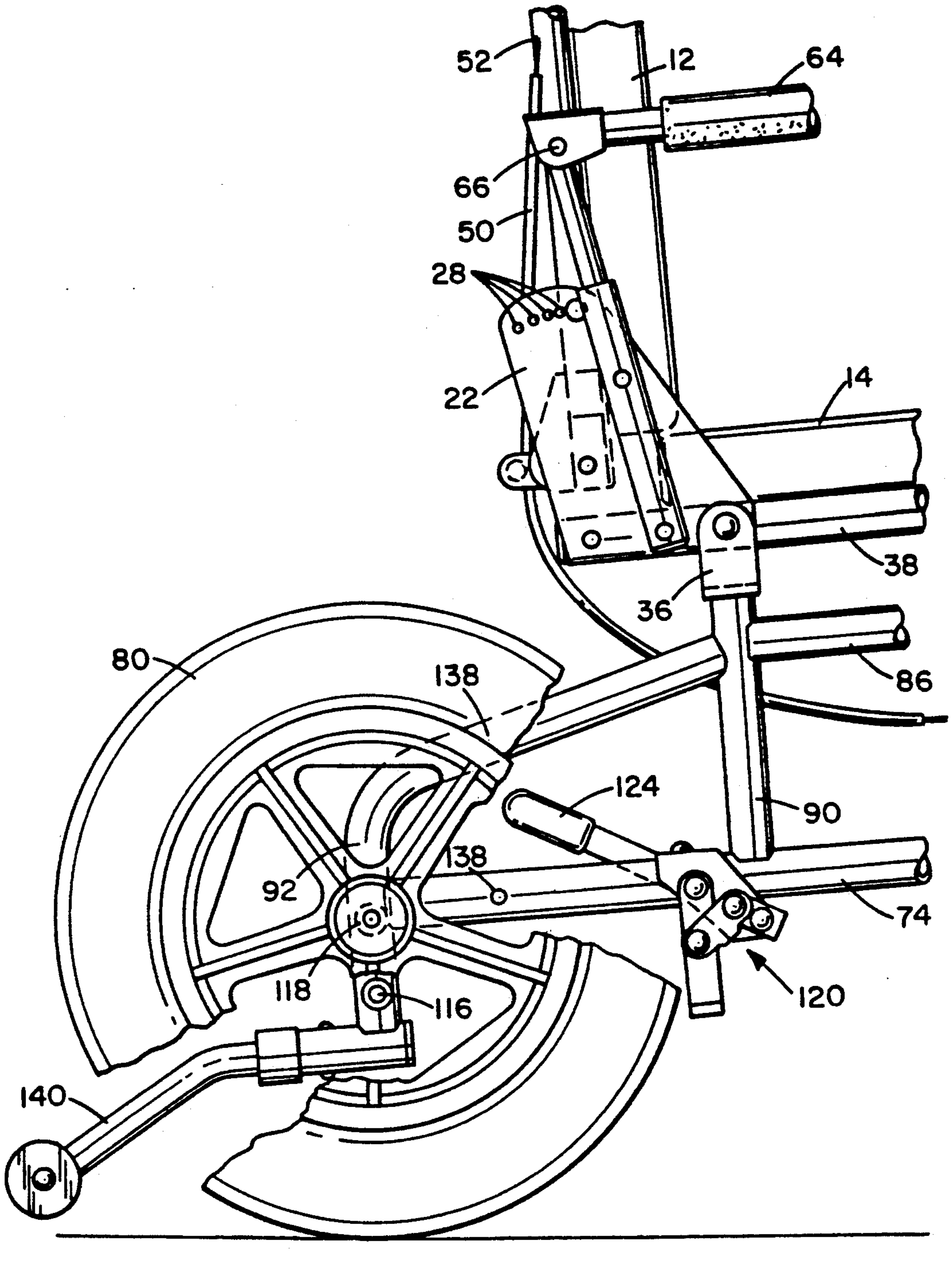
FIG. 4 is an enlarged, detailed view of the wheelchair particularly illustrating the brake assembly.
Figure 5:
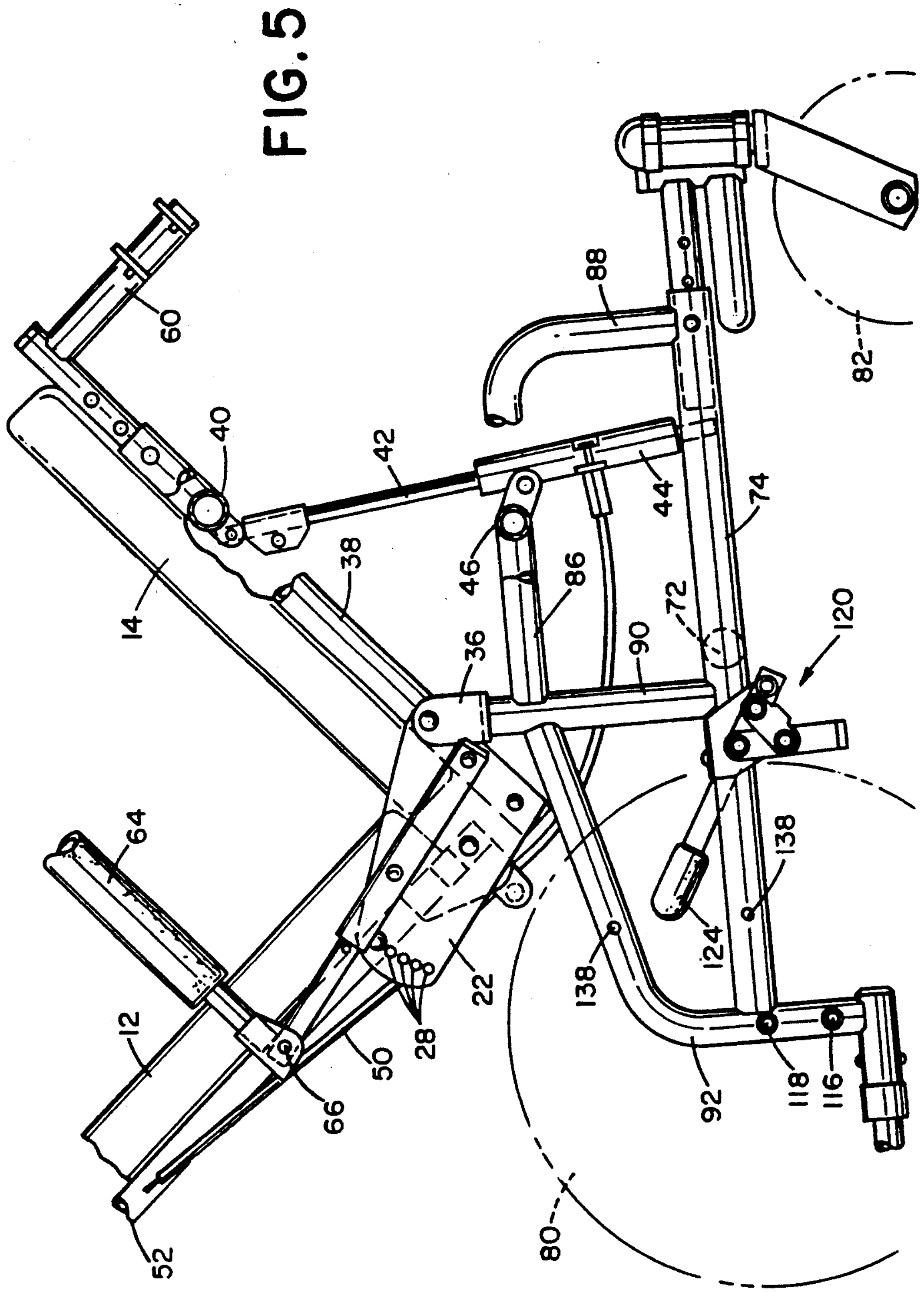
FIG. 5 is an enlarged, detail view of means for pivoting the seat relative to the frame.

As best illustrated in FIG. 3, the cross member 72 includes a fastener 100 that retains cross member portions 72*a*, 72*b* together. The cross member portions 72*a*, 72*b* define an extendable, telescoped arrangement that allows the right-hand and left-hand main frame elements 70*a*, 70*b* to be selectively positioned at various lateral dimensions relative to one another. Thus, as the wheelchair user grows, the frame elements 70*a*, 70*b* can be spaced further and further apart as desired.

Likewise, a generally U-shaped caster wheel frame 102 includes a fastener 104 in the central portion that may be received in any one of plural openings and permits variable dimensioning of the frame portions 102*a*, 102*b*. Further, elements 106*a*, 106*b* extending from the posts 108*a*, 108*b* of the U-shaped caster frame are secured to the frame elements 70*a*, 70*b* by means of fasteners 110. This interconnection of tile U-shaped caster frame with the main frame element is, again, in a telescoping arrangement and includes plural fastener receiving openings 112 that allow selective longitudinal extension of the caster frame from the main frame element. In this manner, the wheel base of the chair can be incrementally extended.

The rear wheels 80 are slightly larger in diameter than the front wheels 82. The rear wheels can be mounted in one of two vertically spaced sleeves or journals 116, 110 which define the axle or rotational axis of the rear wheels.

A toggle type wheel lock 120 is mounted on frame member 72 (FIG. 4) adjacent the central vertical member 90. The toggle type wheel locks 120*a*, 120*b* are simultaneously actuated in the attended wheelchair arrangement by an interconnecting member 122 (FIG. 3) . A lever 124 extends from the member 122 and permits an attendant to simultaneously actuate both wheel locks 120*a*, 120*b* by depressing the lever with his foot.

Figure 6:
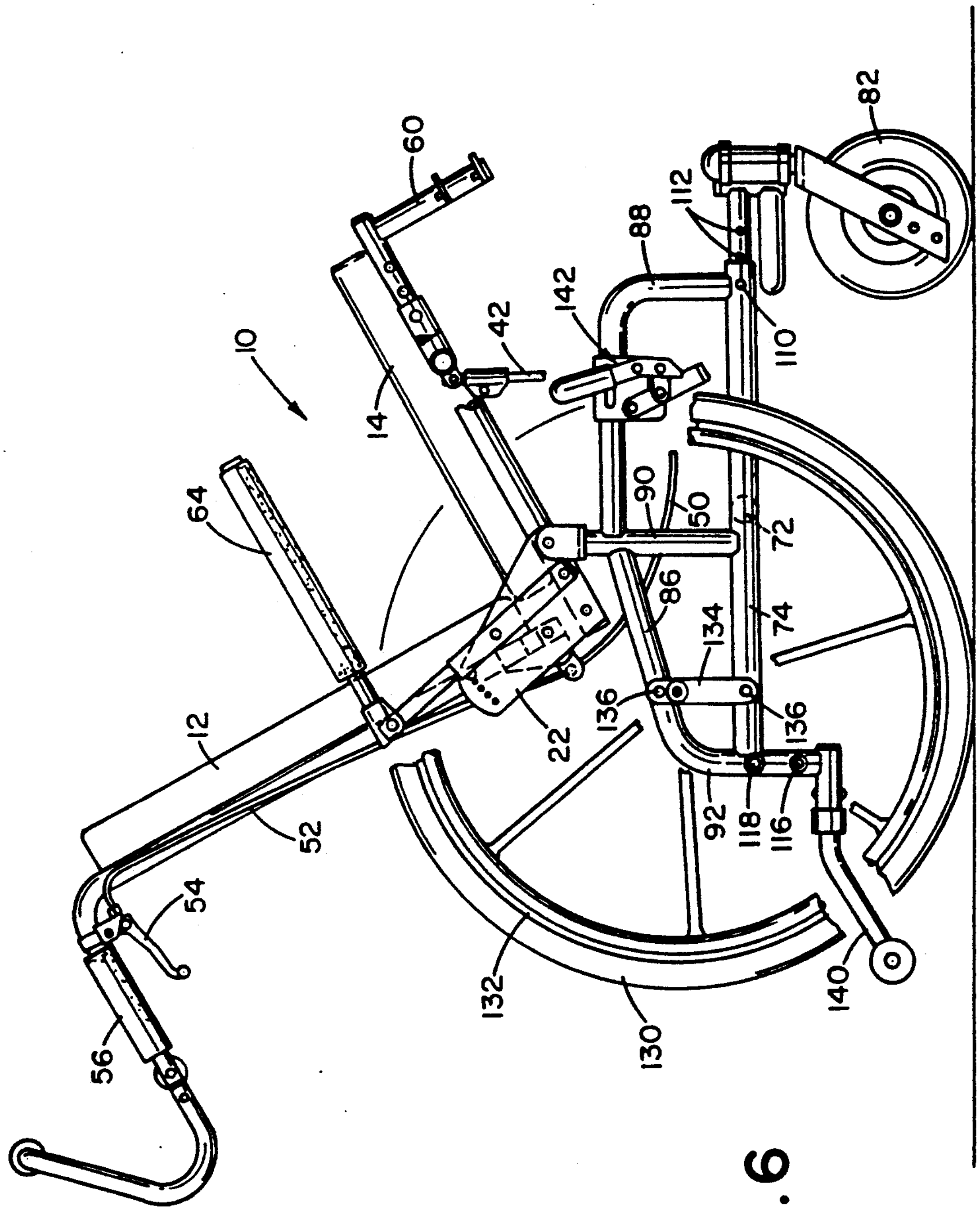
FIG. 6 is a side elevational view of the self propelled wheelchair arrangement showing the wheelchair in a pivoted position.
Figure 7:
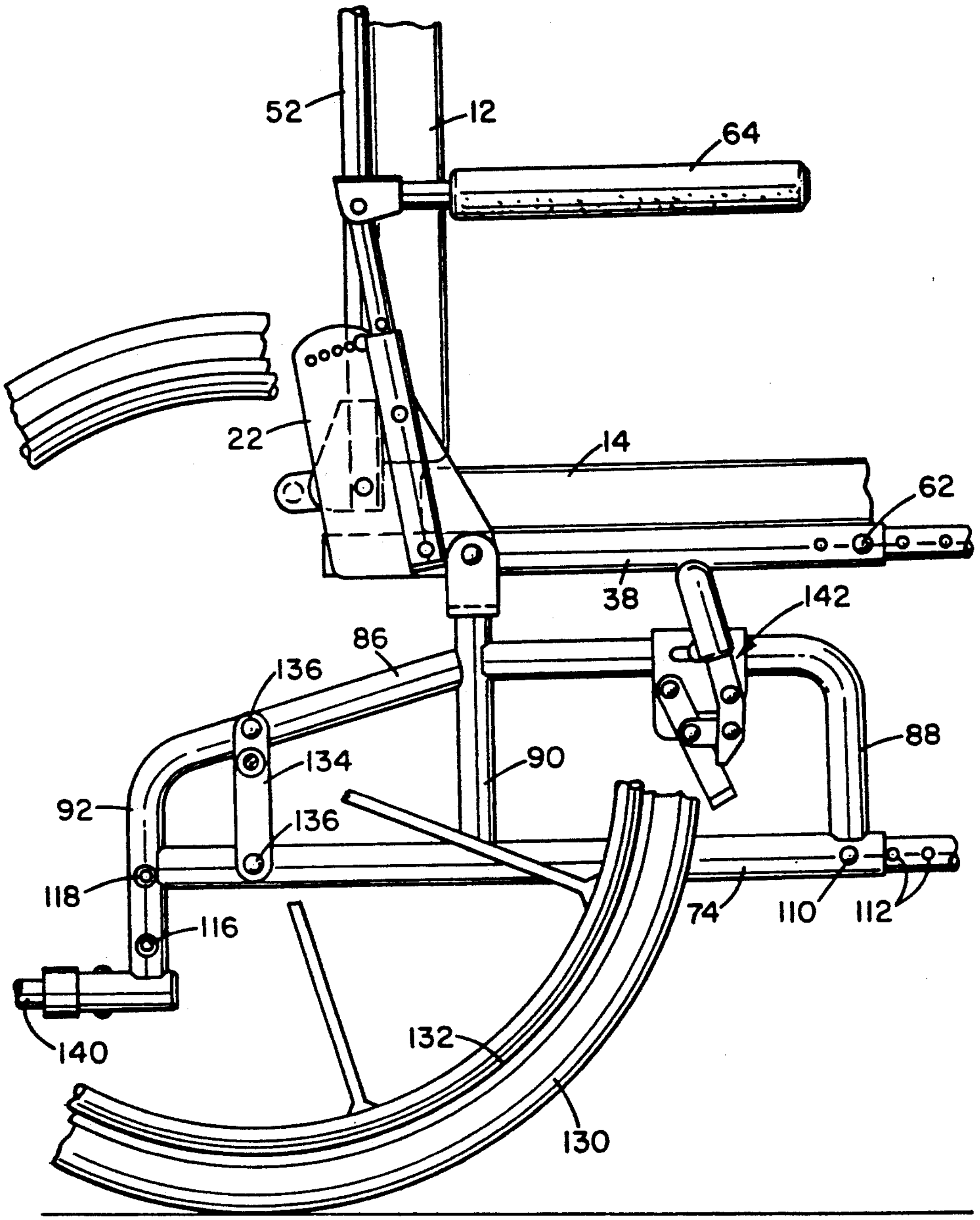
FIG. 7 is an enlarged, detail view of the brake assembly in the self propelled wheelchair arrangement.
Figure 8:
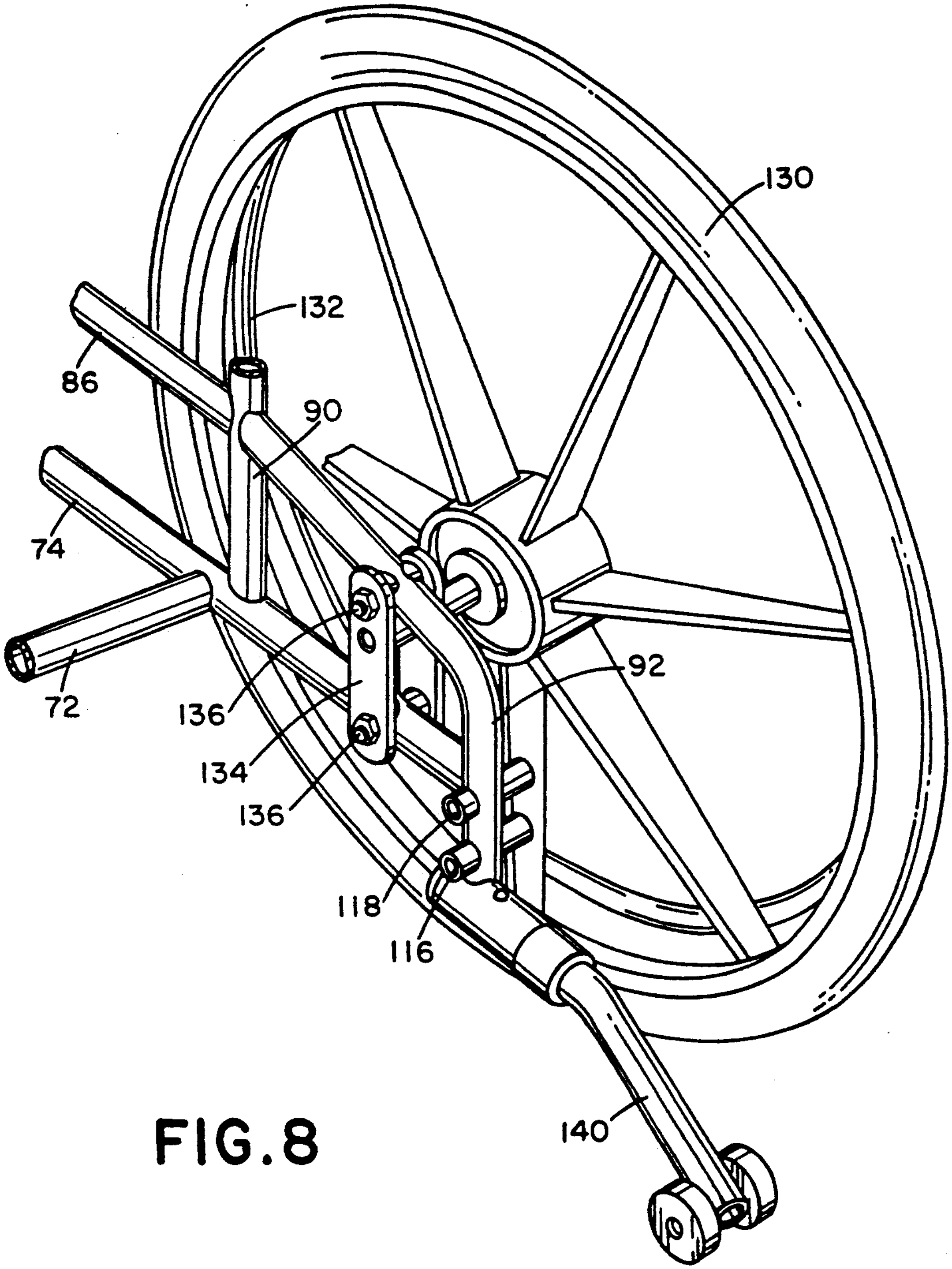
FIG. 8 is a rear view of the FIG. 6 embodiment particularly illustrating the mounting of the wheels in the self propelled arrangement.

With reference to FIGS. 6-8, the conversion of the attended chair to a self propelled wheelchair arrangement will now be described in greater detail. The most evident change is the removal of the rear wheels 80 and addition of much larger diameter rear wheels 130. Each of these rear wheels 130 includes a hand rail 132 that enables the chair occupant to manually rotate the rear wheels.

The wheels 80 are removed from either sleeve 116 or 118 and a bracket 134 (FIG. 8) is secured to main frame members 74, 86 at an area between frame members 90, 92. Openings 138 are predrilled in the horizontal members 74, 86 (FIG. 3) to receive fasteners 136 of the bracket. The bracket positions the rotational axis of the self propelled rear wheels 130 at a region slightly upward and forward from the rotational axis of tile wheels 80 in the attended arrangement. Because of the enlarged diameter of the wheels 130, it is necessary to include anti-tip means 140 (FIG. 8) that extend from each main frame element **70*a*, 70*b***. This prevents the wheelchair from inadvertently tipping backwards as is well known in the art.

Separate toggle type wheel locks 142 are mounted on main frame member 86 at an area between the vertical frame members 88, 90. These toggle type wheel locks are individually actuated and the common lock 120 used with the attended arrangement is removed from the wheelchair.

Still another change in converting the attended wheelchair to a self propelled wheelchair is the provision of means 150 for limiting the pivoting movement of the seat. As described above, rods 42 permitted the seat to be pivoted through a range of approximately 45° with the attended wheelchair arrangement. This amount of pivotal movement, though, is not permitted with the larger, self propelled wheels 130. Thus to limit the movement of the seat, stop members 152 (FIG. 10) are secured to the lower end of each rod at an area beneath the clamp means 44. This limits the upward movement of the rods through the clamp means and, in turn, pivotal movement of the seat to approximately 30° (FIG. 6) from the upright position shown in FIG. 1.

Thus, a conversion kit comprising a pair of axle mounts, anti-tip means, conventional toggle wheel locks, and a pair of stop members 152 easily convert an attended wheelchair to a self propelled wheelchair. Even then, the seat back can be tilted relative to the seat portion. Likewise, the frame can be laterally and longitudinally extended as desired. Still further, the seat can be pivoted relative to the frame, although it in limited to a 30° range of movement.

Figure 9:
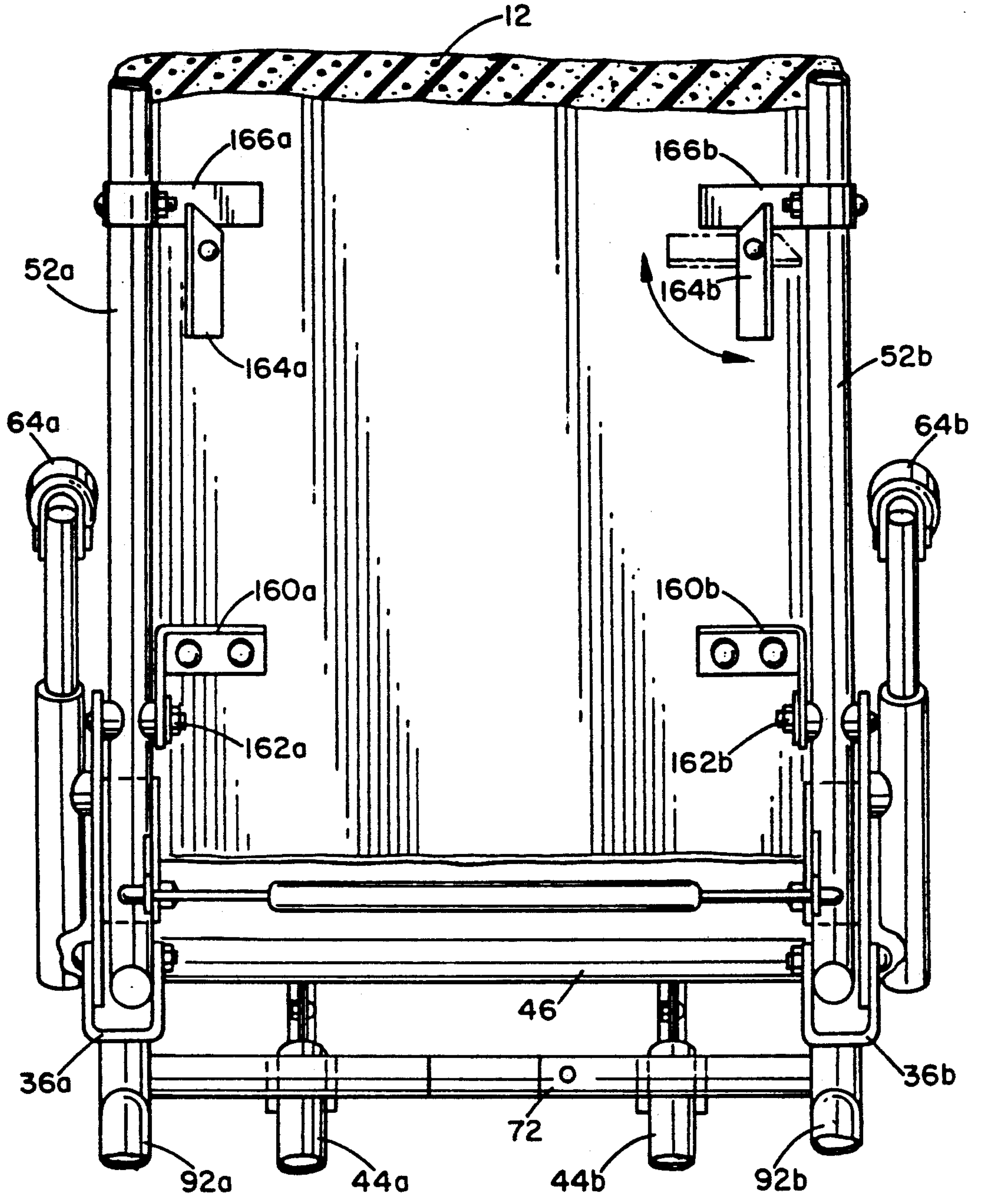
FIG. 9 is a view of the seat back illustrating means for connecting the seat back to the frame.
Figure 10:
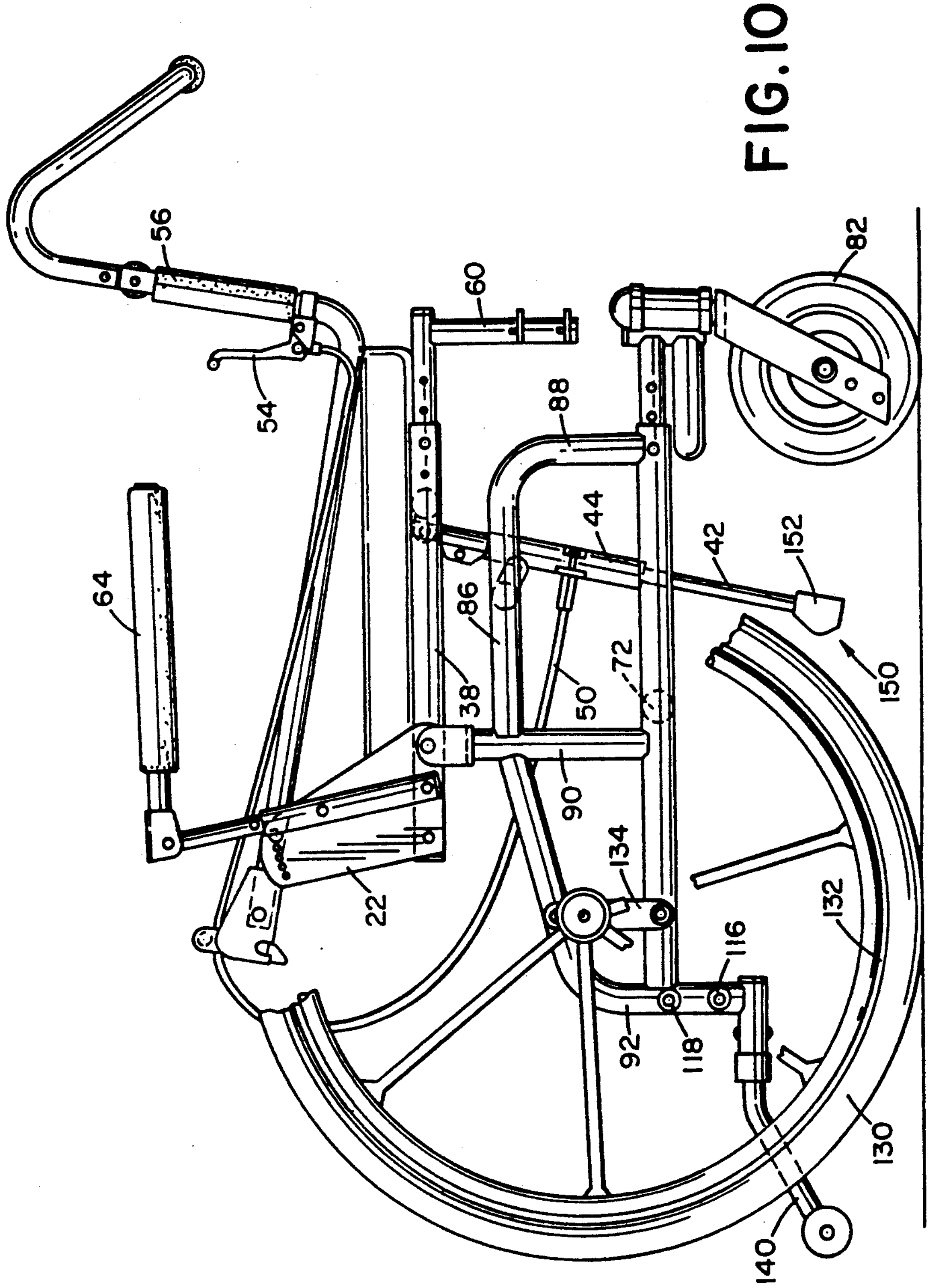
FIG. 10 is a view illustrating the fold down arrangement of the seat back.

Another important feature is the quick release seat back best illustrated in FIGS. 9 and 10. In the upright position of the seat, the seat back frame elements 52 extend in a generally vertical direction. A pair of hook members 160 are secured to the rear face of the seat back and cooperate with projections 162 on the frame elements 52. Additionally, selectively rotatable fasteners 164 are secured to the rear face of the seat back. These fasteners rotate from the position shown in FIG. 9, through approximately 90°, to lock over extending tabs or flanges 166 on the frame elements 52. Thus, by merely rotating fastener **164*a* 90° counterclockwise and fastener 164*b*** 90° clockwise, the seat back is quickly and securely fastened to the seat back frame.

As shown in FIG. 9, this also leaves a substantial region open between the frame elements 52. Thus, there is no cross member that may otherwise interfere with after market conversions. Additionally, the ability to remove the seat back in conjunction with collapsing the seat back frame forwardly (FIG. 10) provides for ease of storage.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A convertible wheelchair adapted for conversion from an attended wheelchair arrangement to a self-propelled wheelchair arrangement, comprising:

a frame;

a seat received on the frame;

front wheels extending from the frame;

two pairs of rear wheels for alternate mounting on the frame, the first pair being substantially smaller in diameter than the second pair for use as an attended wheelchair and the second pair including hand rails for self propelling and alternative use as a self-propelled wheelchair;

means for pivoting the seat relative to the frame through a predetermined range of movement, the pivoting means including a rod slidably extending through a clamping member, the rod having a first end pivotally secured to one of the seat and the frame, the clamping member being pivotally secured to the other of the seat and the frame, and wire means connected between the clamping member and a control lever for selectively locking the rod against sliding movement relative to the clamping member; and means for selectively limiting the range of pivoting movement of the seat relative to the frame, the limiting means including a stop member removably secured to a second end of the rod when the second pair of rear wheels are mounted to the frame.

2. The convertible wheelchair as defined in claim 1 wherein the stop member limits pivoting movement of the seat to approximately 30 degrees.

3. The convertible wheelchair as defined in claim 1 wherein the frame includes means defined on the frame at an area spaced from the rear wheels adapted to receive the second pair of rear wheels.

4. The convertible wheelchair as defined in claim 1 further comprising means for expanding the frame both laterally and longitudinally.

5. The convertible wheelchair as defined claim 1 wherein the seat includes a seat back and a seat portion, and the wheelchair further comprises means for tilting the seat back relative to the seat portion.

6. The convertible wheelchair as defined claim 5 further comprising means for removing the seat back from the frame without effecting the seat portion.

7. The convertible wheelchair as defined in claim 1 further comprising means for simultaneously locking the first pair of rear wheels.

8. The convertible wheelchair an defined in claim 1 wherein the locking means includes a transverse member extending between the rear wheels, and a lever extending therefrom for commonly actuating the locking means.

9. The convertible wheelchair as defined in claim 1 wherein the frame includes first and second generally parallel frame members receiving a seat back therebetween, the parallel frame members being open from the seat portion throughout the extent of the seat back.

10. The convertible wheelchair as defined in claim 1 wherein the predetermined range of movement is approximately 45 degrees.

11. A convertible wheelchair adapted for conversion from an attended wheelchair to a self-propelled wheelchair, comprising:

a seat having a seat portion and a seat back;

first and second front wheels;

two pairs of rear wheels, the first pair being substantially smaller in diameter than the second pair, and the second pair including hand rails for self propelling;

a frame operatively receiving the seat and having first and second openings adapted to receive the first pair of rear wheels for an attended wheelchair arrangement therein, and third and fourth openings spaced therefrom adapted to alternatively receive the second pair of rear wheels for a self-propelled wheelchair arrangement;

means for pivoting the seat relative to the frame through a predetermined range of movement, the pivoting means including a rod slidably extending through a clamping member, the rod having an upper end pivotally secured to the seat, the clamping member being pivotally secured to the frame, and a wire connected between the clamping means and a control lever for selectively locking the rod against sliding movement relative to the clamping member; and means for limiting the pivoting movement of the seat to a range substantially less than the predetermined range of movement when the second pair of rear wheels are mounted on the wheelchair, the limiting means including a stop member removably secured to a lower end of the rod for reducing the extent of sliding movement of the rod.

12. The convertible chair as defined in claim 11 further comprising means for simultaneously locking the first pair of rear wheels in the attended arrangement.

13. The convertible wheelchair as defined in claim 11 further comprising means for altering the relative angle between the seat portion and seat back.

14. The convertible wheelchair as defined in claim 11 further comprising means for releasably attaching the seat back to the frame.

15. The convertible wheelchair as defined in claim 14 wherein the attaching means includes rotatable elements mounted on the seat back adapted for cooperation with tabs extending from the frame, the tabs being defined on the frame and maintaining a substantially open area when the seat back is removed therefrom.

16. The convertible wheelchair as defined in claim 11 further comprising anti-tip means operatively associated with the frame in the self-propelled arrangement.

17. The convertible wheelchair as defined in claim 11 further comprising means for laterally and longitudinally extending the dimensions of the wheelchair.

18. The convertible wheelchair as defined in claim 17 wherein the extending means includes telescoping frame elements that permit incremental charges in the lateral and longitudinal dimensions of the wheelchair without additional components.

19. The convertible wheelchair as defined in claim 11 wherein the predetermined range of movement is approximately 45 degrees.

20. The convertible wheelchair as defined in claim 11 wherein the limiting means limits pivoting movement of the seat to approximately 30 degrees when the second pair of rear wheels are mounted on the wheelchair.

* * * * *